J. H. STIPPEL.
HORSE COLLAR.
APPLICATION FILED MAY 31, 1917.

1,259,055.

Patented Mar. 12, 1918.

Inventor,
John H. Stippel
his Attorney.

UNITED STATES PATENT OFFICE.

JOHN H. STIPPEL, OF ST. PAUL, MINNESOTA.

HORSE-COLLAR.

1,259,055.  Specification of Letters Patent.  Patented Mar. 12, 1918.

Application filed May 31, 1917. Serial No. 171,888.

*To all whom it may concern:*

Be it known that I, JOHN H. STIPPEL, a citizen of the United States, residing at St. Paul, in the county of Ramsey and State of Minnesota, have invented certain new and useful Improvements in Horse-Collars, of which the following is a specification.

My invention relates to improvements in horse collars wherein there is frictional contact with the breast straps and traces and with the metal fixtures of the hames. The object of my invention particularly is to provide means for protecting the portion of the collar where this friction takes place and further to protect and reinforce said portions of the collar without involving the main collar seam. I am aware that chafe pieces have been employed in horse collars but they have generally been sewed or secured by the regular stitching and therefore weaken instead of strengthen the stitching of the horse collar and in other ways do not possess the advantages of my construction.

My construction is adapted to cover the stitching, forming a protection therefor, as well as a protection for the collar and may be placed in position or removed without affecting the stitching of the collar.

In the accompanying drawings, forming a part of this specification,

Figure 1:
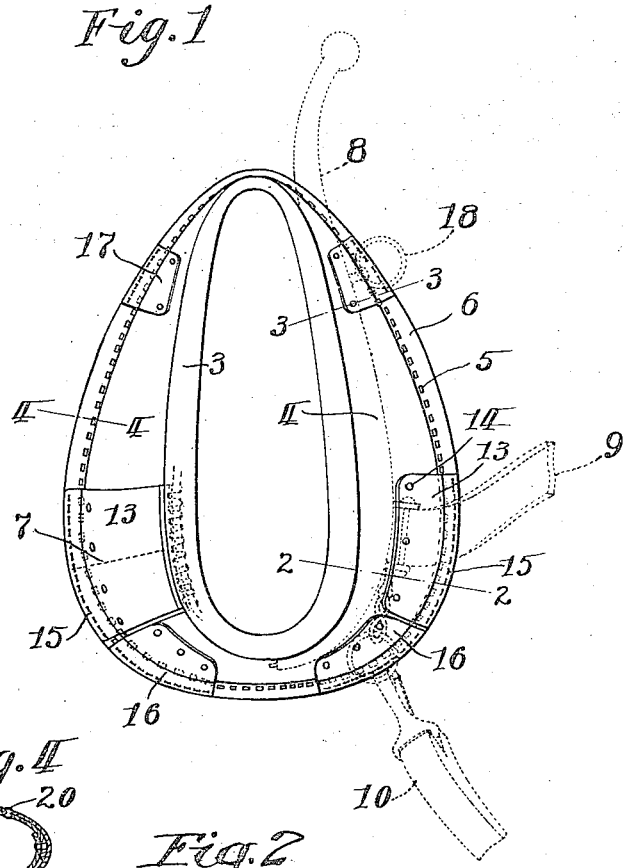
Figure 1 is a front view of a horse collar fitted with my improved features of invention.

I show in the drawings an ordinary form of horse collar, 2 representing the larger roll and 3 the smaller roll of the collar, the two rolls being separated by the usual line of stitching 4 forming a hame-receiving groove of the collar. The inner and outer faces of the larger roll of the collar are connected by the usual outer line of stitching 5, the material of the collar projecting beyond the stitching 5 to form the flange 6.

One side of the collar shown in Fig. 1 is constructed according to what is known in the art as a "piece" collar, the large roll of the collar being formed of pieces of material united by a seam 7. As shown in dotted lines, 8 represents an ordinary hame, to which hame is connected the usual trace 9 and breast strap 10, the breast strap 10 being connected with the hame as by links.

At the point on the large roll or draft section of the collar, where the trace connection with the hame comes, I provide a reinforcing section or patch 13, said patch covering the portion of the collar with which the trace and its connection with the hame comes in contact. The patch 13 is secured as by rivets 14 along its inner edge to the draft section of the collar and along its outer edge to the flange 6 by a line of stitching 15 connecting the patch to the flange outside of the line of stitching 5, which forms the outer seam of the horse collar.

Where the seam 7 is employed, the staples are positioned, as shown in Fig. 1, closer to the outer seam 5 of the horse collar and the patch is carried into the narrowed neck of the horse collar formed by the line of stitching 4, the inner edge of the patch being stitched at that point.

Figure 4:
Fig. 4 is a section of a modified form taken as on line 4—4 of Fig. 1.
Figure 2:
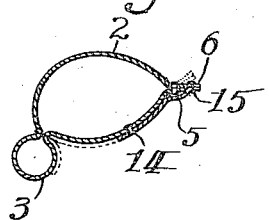
Fig. 2 is a section on line 2—2 of Fig. 1.
Figure 3:
Fig. 3 is a section on line 3—3 of Fig. 1.

Below the patches 13 I employ similar patches 16 secured to the draft section of the horse collar in a similar manner and covering the spot with which the links 11 of the breast strap engage. Above the patches 13 I preferably employ similar patches 17 to protect the collar from the upper links 18.

Where the outer seam of the horse collar is of the form shown in Fig. 4, leaving no flange 6 to support the outer edge of the patch, I carry the patch entirely over the seam and join the edges of the patch to the collar on opposite sides of the seam as by rivets 20.

As will be apparent in both seams shown, the patch covers and protects the outer seam of the collar without any connection with said seam so that the patch may be entirely worn through without affecting the seam and when it is worn through, it can be taken off and a new patch put on without the collar and the outer seam thereof having been weakened. Furthermore by having the inner edges of the patches riveted to the draft portion at some distance inside the seam, the pulling strain, which comes against the same through the draft, particularly upon the traces, is compensated for.

I claim:

1. In combination a horse collar and draft portion thereof formed with an outer seam, supplemental protecting pieces secured to said draft portion in position covering said seam, the securing points between said pieces and said draft portion being on opposite sides of the seam.

2. In combination a horse collar and draft portion thereof, supplemental reinforcing pieces secured inside the seam to the draft portion of the collar by rivets, said pieces projecting over the outer seam of the collar and being unconnected with said outer seam portion but connected with the draft portion of the collar beyond the seam portion for the purpose set forth.

3. In combination a horse collar and draft portion thereof, a pair of supplemental pieces secured over the draft portion of the collar at the spots where the traces contact, similar pieces secured over the draft portion of the collar at the spots where the breast straps connect with the hame contact, all of said pieces being connected with the draft portion of the collar upon opposite sides of the outer seam of the collar and unconnected with the outer seam portion of the collar.

In testimony whereof I affix my signature in presence of two witnesses.

JOHN H. STIPPEL.

Witnesses:
H. S. JOHNSON,
H. D. DANGAN.

Copies of this patent may be obtained for five cents each, by addressing the "Commissioner of Patents, Washington, D. C."